United States Patent
Hagedorn et al.

(10) Patent No.: US 11,331,849 B2
(45) Date of Patent: May 17, 2022

(54) BOTTOM-UP POWDER CONVEYING MECHANISM FOR AN L-PBF SYSTEM, L-PBF SYSTEM AND METHOD FOR RETROFITTING AND OPERATING AN L-PBF SYSTEM

(71) Applicant: Aconity GmbH, Herzogenrath (DE)

(72) Inventors: Yves-Christian Hagedorn, Aachen (DE); Andreas Görres, Aachen (DE)

(73) Assignee: Aconity GmbH, Herzogenrath (DE)

( * ) Notice: Subject to any disclaimer, the term of this patent is extended or adjusted under 35 U.S.C. 154(b) by 187 days.

(21) Appl. No.: 15/737,885

(22) PCT Filed: Jun. 16, 2016

(86) PCT No.: PCT/EP2016/063950
§ 371 (c)(1),
(2) Date: Dec. 19, 2017

(87) PCT Pub. No.: WO2016/202953
PCT Pub. Date: Dec. 22, 2016

(65) Prior Publication Data
US 2018/0297283 A1    Oct. 18, 2018

(30) Foreign Application Priority Data

Jun. 19, 2015 (DE) .......................... 102015109849.0

(51) Int. Cl.
*B29C 31/02* (2006.01)
*B29C 64/153* (2017.01)
(Continued)

(52) U.S. Cl.
CPC .......... *B29C 64/153* (2017.08); *B29C 64/205* (2017.08); *B29C 64/245* (2017.08);
(Continued)

(58) Field of Classification Search
CPC ..... B29C 64/20; B29C 64/153; B29C 64/321; B29C 64/343; B29C 67/00; B29C 31/02;
(Continued)

(56) References Cited

U.S. PATENT DOCUMENTS 4,418,845 A * 12/1983 Hehl ...................... B29C 45/18
222/162
4,818,562 A * 4/1989 Arcella ................... C23C 26/02
427/597

(Continued)

FOREIGN PATENT DOCUMENTS

DE    19649865 C1    2/1998
DE    19952998 A1    5/2001
(Continued)

OTHER PUBLICATIONS

Preliminary Report on Patentability of the International Searching Authority in English from corresponding Patent Cooperation Treaty (PCT) Application No. PCT/EP2016/063950, completed Dec. 19, 2017.

(Continued)

*Primary Examiner* — Andrew D Stclair
(74) *Attorney, Agent, or Firm* — Gardner, Linn, Burkhart & Ondersma LLP

(57) ABSTRACT

A bottom-up powder conveying mechanism for a powder bed-based laser melting (PBLM) system includes a powder reservoir having a movable floor operable as a piston to convey powder towards an upper opening in the powder reservoir opposite the floor and through the upper opening to a working plane of the PBLM system. The bottom-up powder conveying mechanism further includes an external reservoir connected, via a sloping conduit, to the powder reservoir for conducting powder to the powder reservoir. The powder reservoir includes a side wall with a lower opening that is lower than the upper opening in the powder (Continued)

reservoir and through which the powder reservoir can be filled with the powder. The lower opening is connected in a gas-tight and releasable manner to the sloping conduit in order to be able to conduct the powder in a gravity-driven manner from the external reservoir into the powder reservoir.

9 Claims, 7 Drawing Sheets

(51) Int. Cl.
    *B33Y 40/00*     (2020.01)
    *B29C 64/205*     (2017.01)
    *B29C 64/245*     (2017.01)
    *B29C 64/255*     (2017.01)
    *B33Y 30/00*     (2015.01)
    *B29C 64/343*     (2017.01)

(52) U.S. Cl.
    CPC .......... *B29C 64/255* (2017.08); *B29C 64/343* (2017.08); *B33Y 30/00* (2014.12); *B33Y 40/00* (2014.12)

(58) Field of Classification Search
    CPC ......... B29C 31/04; B33Y 30/00; B33Y 40/00; B65G 47/44
    See application file for complete search history.

(56) References Cited

U.S. PATENT DOCUMENTS

| | | | |
|---|---|---|---|
| 5,252,264 A | 10/1993 | Forderhase et al. | |
| 6,764,636 B1 | 7/2004 | Allanic et al. | |
| 7,625,413 B1 | 12/2009 | Reed, Jr. | |
| 7,931,462 B2 | 4/2011 | Mattes | |
| D835,162 S | 12/2018 | Reches et al. | |
| 2002/0060137 A1 | 5/2002 | Byeong-Ho | |
| 2004/0084814 A1* | 5/2004 | Boyd | B29C 64/153 264/497 |
| 2005/0263932 A1* | 12/2005 | Heugel | B29C 64/153 264/113 |
| 2006/0076700 A1 | 4/2006 | Phillips | |
| 2007/0074659 A1 | 4/2007 | Wahlstrom | |
| 2008/0203621 A1 | 8/2008 | Mattes | |
| 2009/0020901 A1* | 1/2009 | Schillen | B29C 64/153 264/31 |
| 2012/0164322 A1 | 6/2012 | Teulet | |
| 2012/0284991 A1* | 11/2012 | Kusz | C12M 23/14 29/428 |
| 2012/0323345 A1 | 12/2012 | Jonas et al. | |
| 2013/0108726 A1* | 5/2013 | Uckelmann | B33Y 30/00 425/174.4 |
| 2013/0177766 A1 | 7/2013 | Grebe et al. | |
| 2014/0084517 A1 | 3/2014 | Sperry et al. | |
| 2014/0329953 A1* | 11/2014 | Paternoster | C08L 77/02 524/441 |
| 2015/0139849 A1* | 5/2015 | Pialot, Jr. | B22F 3/1055 419/55 |
| 2016/0185040 A1* | 6/2016 | Costlow | B29C 64/245 264/40.5 |
| 2018/0194126 A1 | 7/2018 | Hagedorn et al. | |
| 2018/0297275 A1 | 10/2018 | Hagedorn et al. | |

FOREIGN PATENT DOCUMENTS

| | | | |
|---|---|---|---|
| DE | 10342883 A1 | 5/2005 | |
| DE | 112004000301 T5 | 1/2006 | |
| DE | 102004041633 A1 | 3/2006 | |
| DE | 202009010489 U1 | 10/2009 | |
| DE | 102009029765 A1 | 12/2010 | |
| DE | 202009016400 U1 | 4/2011 | |
| DE | 202011003443 U1 | 12/2011 | |
| DE | 202012007238 U1 | 8/2012 | |
| EP | 1316408 A1 | 6/2003 | |
| EP | 2186625 A2 * | 5/2010 | ............... G06T 1/00 |
| EP | 2399695 A1 | 12/2011 | |
| EP | 2732889 A2 | 5/2014 | |
| GB | 2315699 A | 11/1998 | |
| WO | 2019031979 A1 | 2/2019 | |

OTHER PUBLICATIONS

International Search Report and Written Opinion of the International Searching Authority from corresponding Patent Cooperation Treaty (PCT) Application No. PCT/EP2016/063950, indicated completed on Dec. 5, 2016.

* cited by examiner

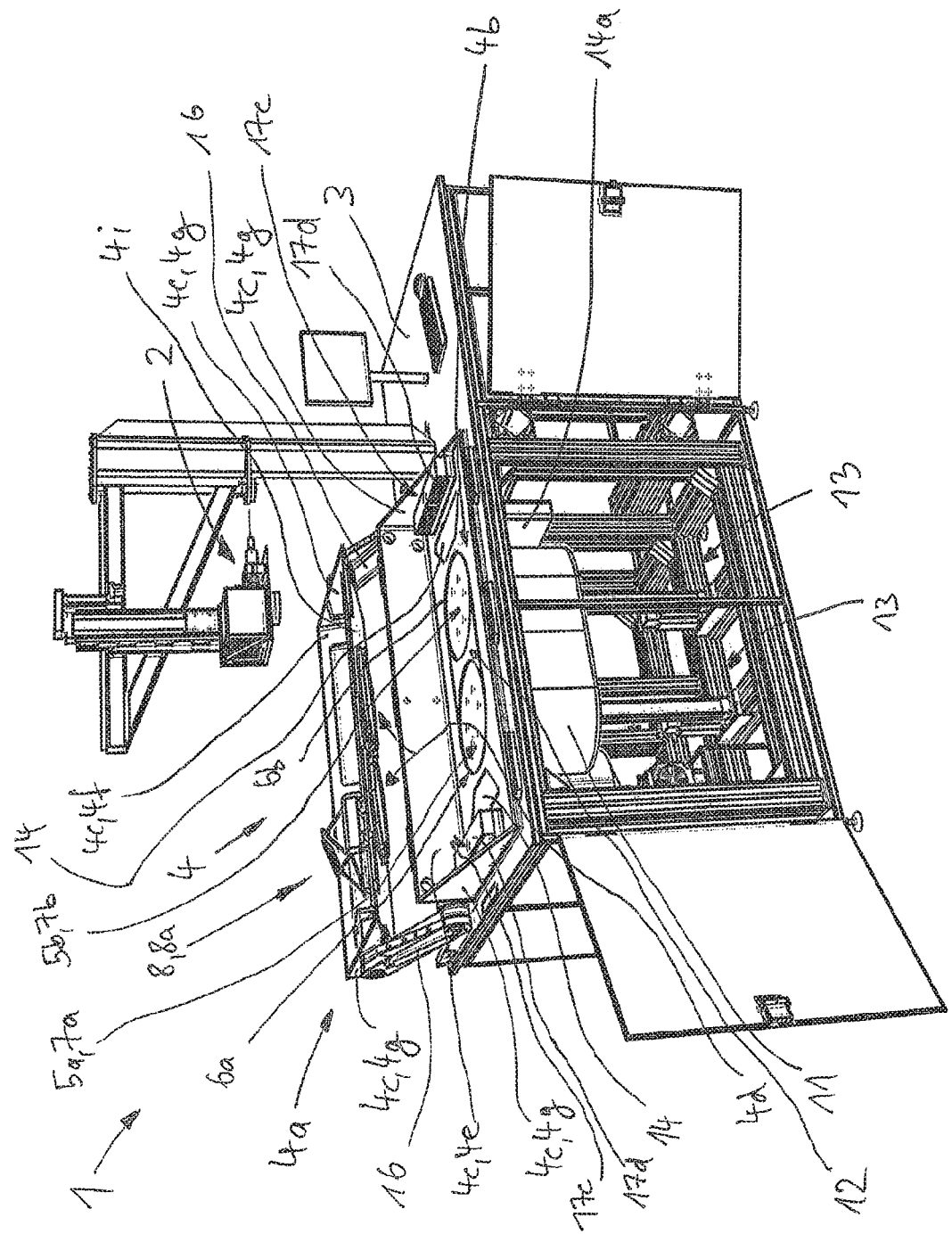

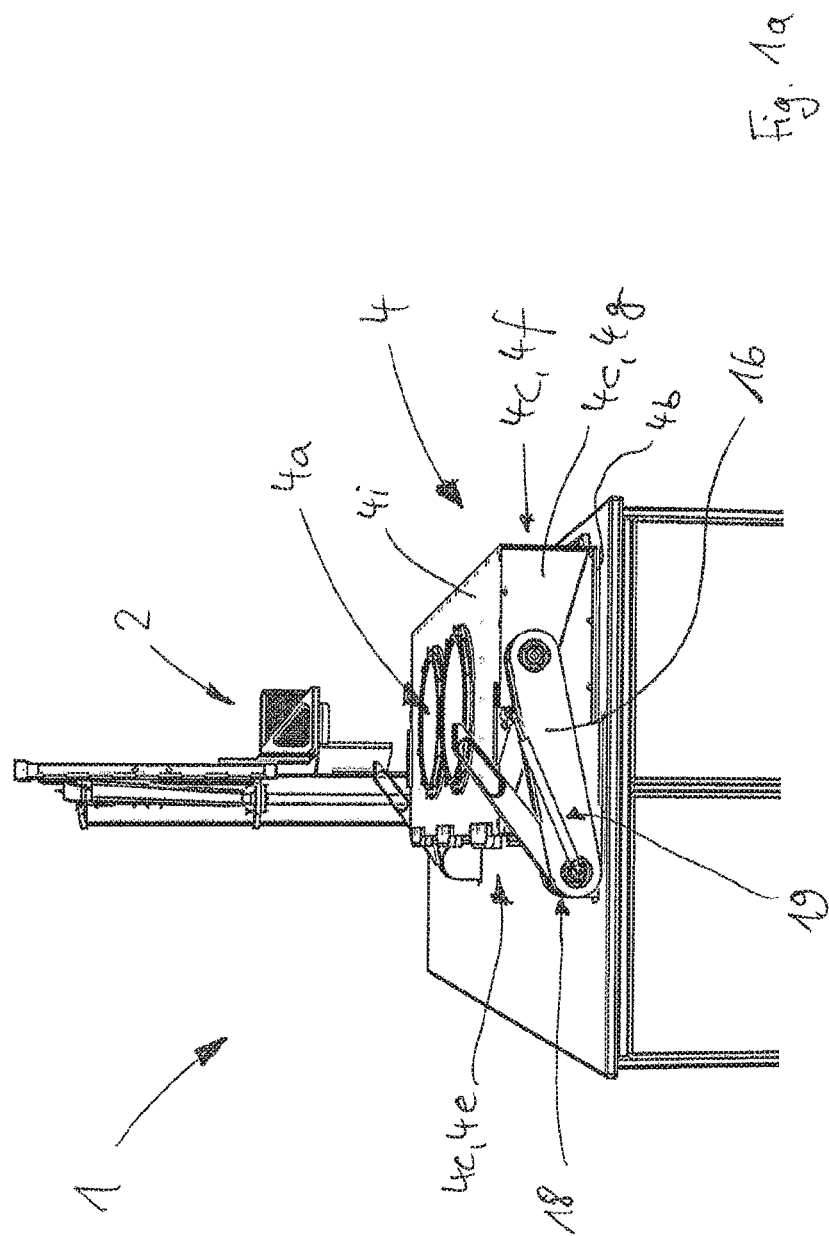

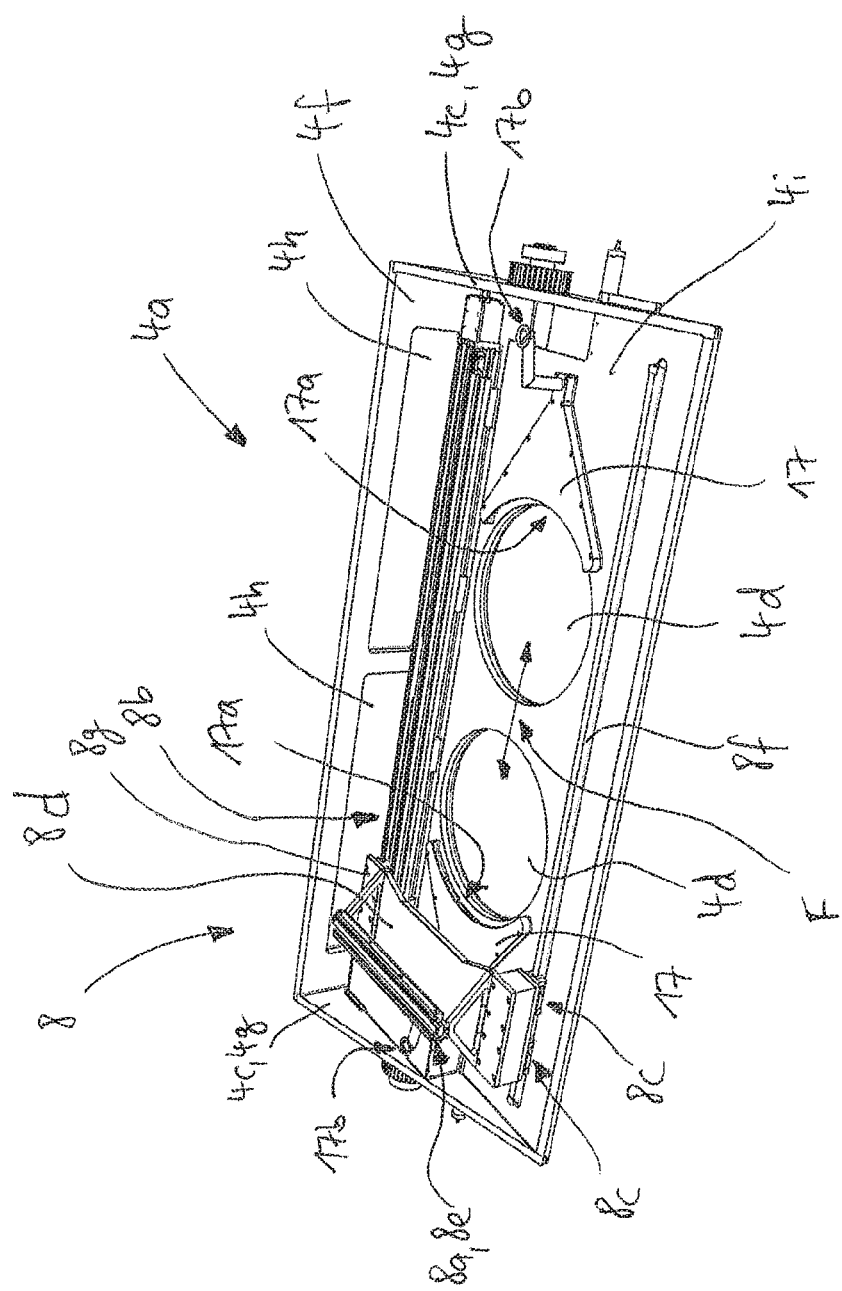

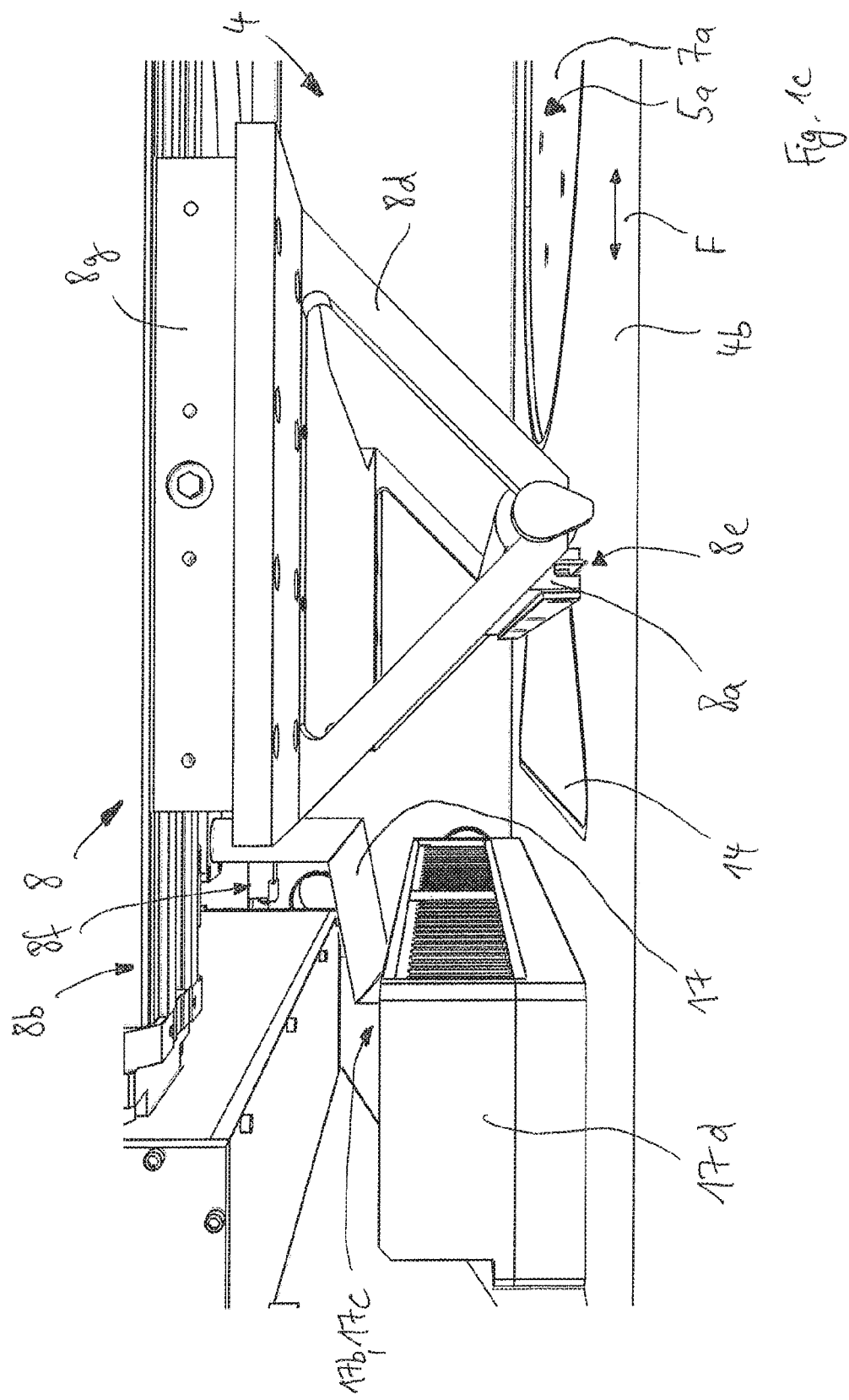

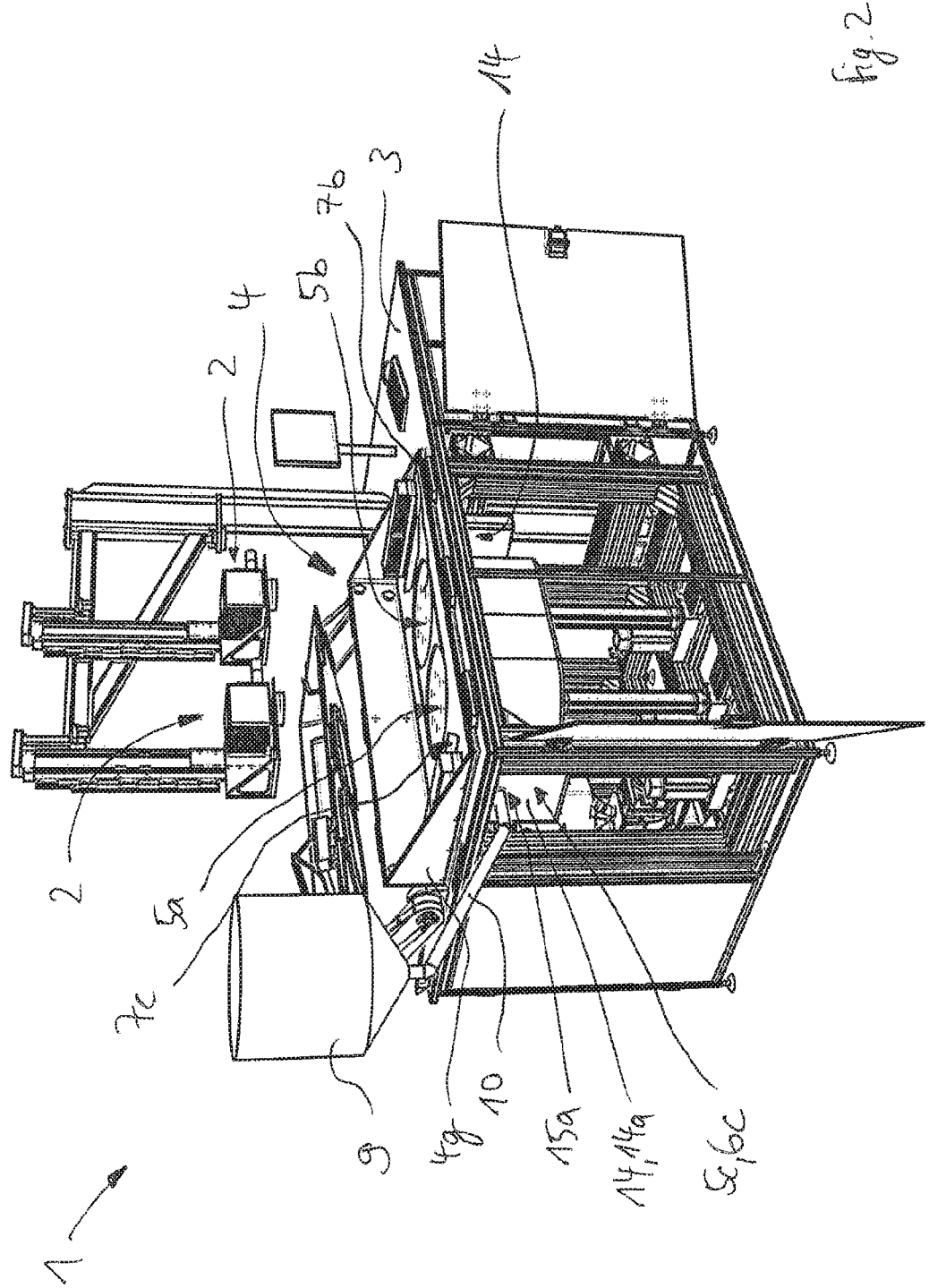

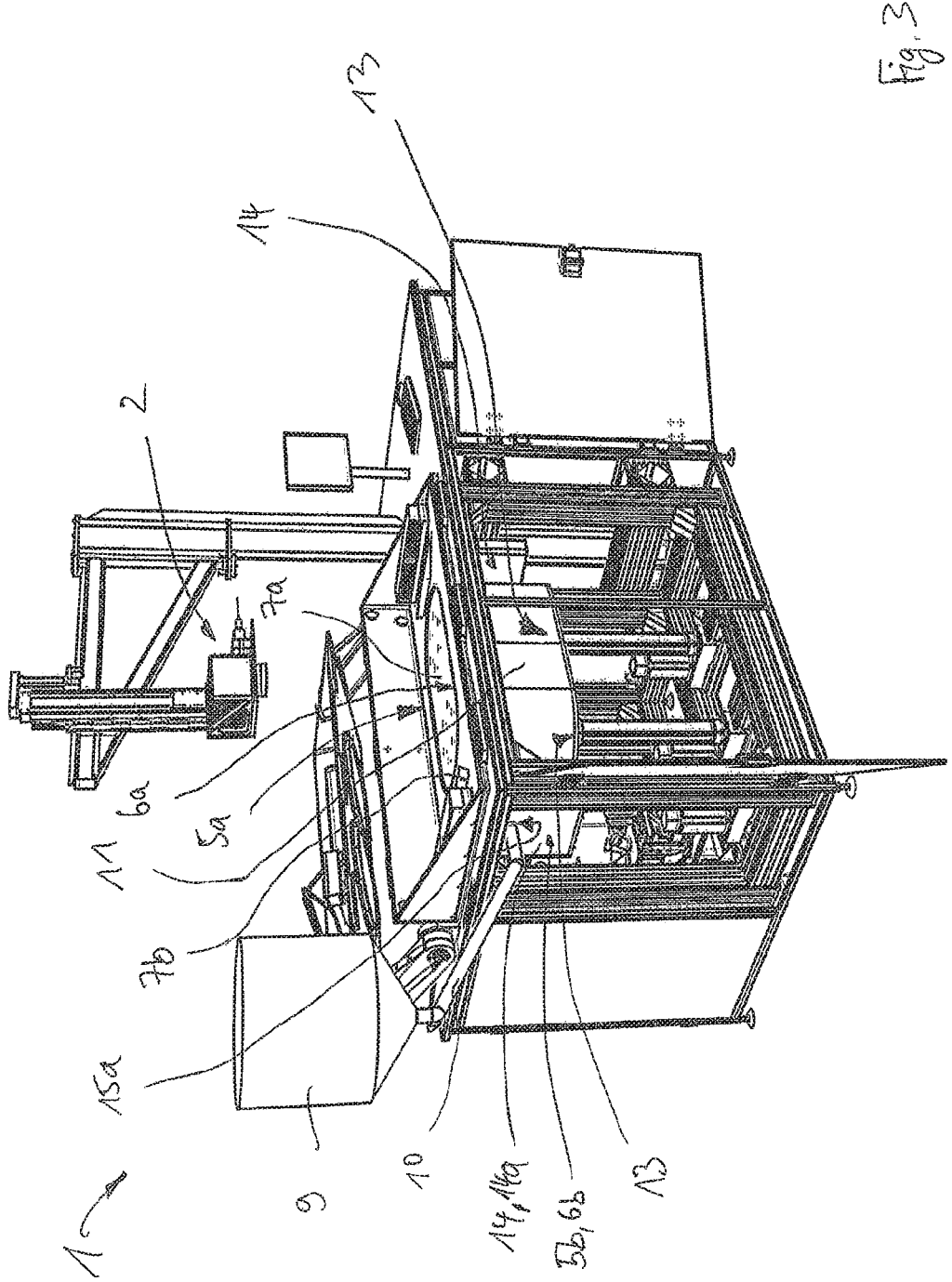

BOTTOM-UP POWDER CONVEYING MECHANISM FOR AN L-PBF SYSTEM, L-PBF SYSTEM AND METHOD FOR RETROFITTING AND OPERATING AN L-PBF SYSTEM

CROSS REFERENCE TO RELATED APPLICATIONS

The present application claims the priority benefits of International Patent Application No. PCT/EP2016/063950, filed Jun. 16, 2016, and claims benefit of German Application DE 10 2015 109 849.0 filed Jun. 19, 2015 which are incorporated herein by reference.

BACKGROUND OF THE INVENTION

The invention relates to a bottom-up powder conveying mechanism for a PBLM system.

Moreover, the invention relates to a PBLM system having a bottom-up powder conveying mechanism, wherein the PBLM system includes a first reservoir which is operated as a component reservoir and has a floor movable in the manner of a piston and as part of the bottom-up powder conveying mechanism has a reservoir which is operated as a powder reservoir and has a floor movable in the manner of a piston and a method for retrofitting and operating a PBLM system having a bottom-up powder conveying mechanism, wherein the PBLM system is operated as a single scanner unit or as a multiscanner unit and includes a first reservoir which is operated as a component reservoir and has a floor movable in the manner of a piston and has as part of the bottom-up powder conveying mechanism, a second reservoir which is operated as a powder reservoir and has a floor movable in the manner of a piston, and includes a collecting reservoir for excess powder, wherein the collecting reservoir has an upper opening.

Powder bed-based laser melting (PBLM), for which the term of selective laser melting is also used, belongs to the group of generative manufacturing methods which are also referred to as additive manufacturing (AM) methods. PBLM is known e.g. from the German patent document DE 196 49 865 C1.

As a powder bed-based method, PBLM is to be distinguished in particular from selective laser sintering and from laser deposition welding. In the case of PBLM, components are produced in layers from a material which initially is in powder form, in particular in the form of synthetic materials or metals which—unlike in the case of laser deposition welding—is provided in layers as a resting powder bed and—unlike in the case of selective laser sintering—is completely melted and solidifies without the addition of binding agents.

In the case of the PBLM method which can be performed on a corresponding PBLM system, a movable application medium which can be designed e.g. as a brush can be used to apply a first thin powder layer of the material to be processed at a uniform layer thickness of typically 10 to 100 μm onto a substrate plate which is also defined as a base plate. The application medium is typically attached to a slide which is correspondingly movably mounted for moving the application medium as required. The substrate plate is supported by a support plate and is releasably attached, e.g. screwed, thereto. In this case, the support plate and thus also the substrate plate are arranged initially in a starting position in which the substrate plate with its surface is located below a horizontally extending working plane by the amount of the desired layer thickness. Typically, the support plate forms the movable floor of a reservoir (component reservoir) which, together with an upper opening opposite the floor, adjoins the working plane below the working plane. In this case, the floor is fitted in the manner of a piston inside the side wall of the reservoir extending at a right angle to the floor and is movable in order to be able to be lowered together with the substrate plate in steps in relation to the working plane. The application medium is movable above and in parallel with the working plane via the slide in order to push or apply the powder, starting from the working plane, onto the support plate or the substrate plate arranged thereon. When travelling over the reservoir, the application medium completely spans the opening of the reservoir in order to be able to generate, between the support plate and the working plane, a uniform powder layer with a surface which is as flat as possible.

Subsequently, the powder of the applied layer is selectively or locally completely melted by means of a laser beam, i.e. only in regions selected according to a 3D CAD model of the component to be manufactured. For this purpose, the 3D CAD model is divided by software into individual layers (slicing), from which strips are determined in the manner of contour lines of the component as selected regions, along which the laser beam is guided for selectively or locally melting the respective powder layer. The complete melting and subsequent solidification of the respective powder layer causes the material to be compacted in layers to form the component to be manufactured.

Starting from the starting position, the support plate, which accordingly serves as a construction platform, or the floor of the reservoir, after corresponding scanning of the selected regions of first powder layer, is lowered by the amount of a further desired layer thickness and a further powder layer is applied to the respectively previous layer, is melted and hereby compacted and joined to the previous layer. In this case, at least one of the previous layers is melted again at least partially in order to ensure an integrally joined connection to the following layer. This cycle is repeated with a plurality of powder layers until the component is completed. By means of the selective melting of selected regions in each powder layer, a powder bed which consists of non-fused powder of all applied layers and surrounds the component is also built up in the reservoir between the support plate and the working plane. In order to remove the component from the powder bed, the floor of the reservoir formed by the support plate is raised in the direction of the working plane and thus in the direction of an upper opening of the reservoir opposite the floor and the substrate plate, to which the component is integrally joined via the first layer, is released from the support plate and removed from the PBLM system. The component is subsequently separated, e.g. sawn off, from the substrate plate. In this manner, PBLM can be used to produce three-dimensional components in a mouldless manner, i.e. without tools or moulds, and almost without restrictions in relation to the geometric component complexity.

In order to provide the application medium of a PBLM system with the powder on the working plane, powder conveying mechanisms according to the bottom-up principle and according to the top-down principle are essentially known and are used to convey the powder to the working plane. In the case of a bottom-up mechanism, the powder is conveyed from below the working plane upwards onto the working plane and in the case of a top-down mechanism the powder is conveyed from above the working plane downwards onto the working plane.

For example, PBLM systems are known which have a bottom-up mechanism which comprises a reservoir (powder reservoir) which is designed similarly to the above-described reservoir for the component. Accordingly, this reservoir likewise comprises a floor which is movable in the manner of a piston. An upper opening in the reservoir opposite the floor is arranged in the working plane, from where the reservoir adjoins the working plane below the working plane. The powder stored in the reservoir of the bottom-up powder conveying mechanism is moved by raising the support plate, which forms the floor, inside the reservoir and, in association therewith, reducing the available volume of the reservoir in the direction of the upper opening or through the upper opening of the reservoir at that location and is thus conveyed to the working plane where it is provided to the application medium. By inversely lowering the floor, the available volume of the reservoir is increased in order to be able to receive and store a corresponding quantity of powder therein.

Unlike in the case of top-down mechanisms, the powder in a bottom-up mechanism does not fall in a gravity-driven manner into the region of the working plane. As a result, dust formation resulting in optical and movable components of the PBLM system becoming undesirably contaminated is minimised and as a result good process quality and stability are ensured. Furthermore, bottom-up mechanisms comprising a reservoir with a floor which can be moved like a piston can be cleaned particularly easily if the powder has to be replaced as far as possible without residue e.g. for a change of material. This is associated with greater outlay in the case of other bottom-up mechanisms which convey the powder to the working plane e.g. by means of a screw conveyor.

Moreover, it is known to provide a PBLM system not only with the component reservoir but also with a so-called powder overflow, into which excess powder still located upstream of the slide can be pushed, after the slide has travelled over the component reservoir for the purpose of building-up a new powder layer. For this purpose, the working plane has, in addition to the component reservoir, an aperture which is formed by the opening of a collecting reservoir which forms the powder overflow and adjoins the aperture via the opening below the working plane and into which the excess powder can fall. Such a powder overflow means that the process chamber can be kept as free as possible of excess powder to ensure good process stability.

In order to prevent oxidation-induced contamination of the material during the melting process, PBLM is performed in a protective gas atmosphere. As a result, relative component densities of more than 99% can be achieved by means of PBLM. In contrast, the relative density of the powder which is referred to as bulk density is about 50% and thus about half the relative density of the component produced. The relative density thus serves as a measurement of the porosity of the material in its respective current form, i.e. as a finished component or as a powder, in relation to the corresponding material in a pore-free form. Also, the components manufactured by PBLM have mechanical properties which largely correspond to those of the base material or to those of the components which are produced from the base material by means of conventional methods.

For this purpose, PBLM systems have a gas-tight process chamber in which a corresponding protective gas atmosphere, in particular an inert gas atmosphere including argon or nitrogen, is maintained. Typically, at least the working plane and the application medium are arranged directly inside the process chamber. A protective gas atmosphere also prevails in the component reservoir comprising the construction platform and the substrate plate, the powder reservoir of the bottom-up powder conveying mechanism and the powder overflow so that they are connected accordingly in a gas-tight manner to the process chamber for this purpose.

In the case of known PBLM systems comprising a bottom-up powder conveying mechanism, the powder is typically loaded when the process chamber is open and therefore not during ongoing operation. Moreover, known PBLM systems are typically configured from the outset to a design selected once, in particular with regard to the dimensioning of the construction platform and thus with regard to the maximum size of the components which can be produced. There is no provision for subsequent adaptation or retrofitting in this respect to suit changing requirements. Such a PBLM system is known e.g. from the German laid-open document DE 10 2004 041 633 A1.

A bottom-up powder conveying mechanism having a reservoir which is operated as a powder reservoir and has a floor which is movable in the manner of a piston in order to convey powder in the direction of an upper opening in the reservoir opposite the floor and/or through the upper opening in the reservoir and thus to a working plane of the PBLM system, wherein the bottom-up powder conveying mechanism comprises an external reservoir which can be closed in a gas-tight manner and is connected in a gas-tight manner to a gas-tight conduit in order to be able to conduct powder, via the conduit, from the reservoir into the reservoir which is operated as a powder reservoir is known from DE 10 2009 029 765 A1.

EP 1 316 408 A1 discloses a bottom-up powder conveying mechanism which comprises a metering chamber having a floor which is movable in the manner of a piston in order to convey powder in the direction of an upper opening in the metering chamber opposite the floor. A lower opening which is connected to a collecting reservoir via a conduit is provided in a side wall of the metering chamber below the upper opening. The collecting reservoir is arranged below the lower opening and below a second reservoir serving as a component reservoir and is connected to the component reservoir via a tubular powder discharging device. As a result, powder can be discharged from the component reservoir into the collecting reservoir and can be conveyed by a fan through the line back into the powder reservoir.

DE 20 2011 003 443 U1 likewise discloses a PBLM system comprising a reservoir, operated as a powder reservoir, of a bottom-up powder conveying mechanism, an extraction channel being provided in the side wall thereof.

SUMMARY OF THE INVENTION

The invention provides an improved bottom-up powder conveying mechanism for a PBLM system and an improved PBLM system which in each case can subsequently be modularly extended or retrofitted to suit changing requirements, and provides a method for retrofitting and operating a PBLM system in order to be able to subsequently adapt it modularly to suit changing requirements.

In accordance with an aspect of the invention, an improved and modularly extendible bottom-up powder conveying mechanism for a PBLM system, which includes a reservoir which is operated as a powder reservoir and has a floor which is movable in the manner of a piston in order to convey powder in the direction of an upper opening in the reservoir opposite the floor and/or through the upper opening in the reservoir and thus to a working plane of the PBLM system, wherein the bottom-up powder conveying mechanism has an external reservoir which can be closed in a gas-tight manner and is connected in a gas-tight manner to a gas-tight conduit in order to be able to conduct powder, via the conduit, from the reservoir into the reservoir which is operated as a powder reservoir, is achieved in that the reservoir operated as a powder reservoir has, in a side wall, an opening which is lower than the upper opening and through which the reservoir can be filled with powder and which can be connected in a gas-tight and releasable manner to the conduit in order to be able to conduct powder in a gravity-driven manner from the external reservoir arranged above the opening through the sloping conduit and through the lower opening into the reservoir operated as a powder reservoir. By reason of the lower opening provided in the side wall, it is no longer absolutely necessary to fill the reservoir via the upper opening, which results in reduced set-up times and non-productive times and in a corresponding increase in productivity. The powder load can be guided through the gas-tight conduit and its gas-tight connection to the lower opening and the reservoir, which can be closed in a gas-tight manner, easily in a reliable manner at with high process stability even during ongoing operation of the PBLM system and thus when the process chamber thereof is closed. This allows, on account of the increased powder availability, a longer uninterrupted operation of the bottom-up powder conveying mechanism and also allows, in the gas-tight closed state, powder to be loaded during ongoing operation of the PBLM system. The protective gas atmosphere in the process chamber can thus be maintained while powder is being loaded by means of the powder conveying mechanism in accordance with the invention. The slope ensures that, particularly in the case of an external reservoir arranged above the opening, powder is loaded automatically by reason of powder which subsequently slides automatically, without additional conveying mechanisms, such as e.g. screw conveyors, having to be used, as is required when conveying powder against gravity.

Moreover, provision may be made that the opening can be closed in a gas-tight manner via a closure and can be opened in order to fill the reservoir with powder through the opening. The protective gas atmosphere in the reservoir can be maintained by the closure e.g. while the PBLM method is being performed.

Moreover, provision may be made in a structurally simple manner that the conduit is designed as a tube or flexible hose.

Moreover, provision may be made that the bottom-up powder conveying mechanism has a closure mechanism, such as in the form of a vacuum closure, in particular in the form of a disk valve, which can be closed and opened automatically or manually in order to regulate/control the filling of the reservoir with powder through the opening, and which is arranged preferably in the conduit and/or the opening and can be closed and opened in particular during ongoing operation of the PBLM system such that powder is conducted through the opening only when the opening is arranged between the working plane and a support plate serving as a floor of the reservoir. This additionally increases the process stability because automatic powder loading is permitted by the closure mechanism only in correspondingly suitable positions of the support plate. Moreover, by using a vacuum closure it is possible to reduce the volume which in the form of the conduit and the reservoir is connected to the process chamber and in which the protective gas atmosphere is to be maintained for the purpose of filling during ongoing operation. If the vacuum closure is closed, e.g. the external reservoir can be opened and/or removed from the conduit in order to be replenished with new powder, and at the same time the protective gas atmosphere on the system side or reservoir side can be maintained in a correspondingly smaller volume.

A modularly extendible or retrofittable PBLM system according to an embodiment of the invention includes a bottom-up powder conveying mechanism, wherein the PBLM system has a first reservoir which is operated as a component reservoir and has a floor movable in the manner of a piston and includes as part of the bottom-up powder conveying mechanism a reservoir which is operated as a powder reservoir and has a floor movable in the manner of a piston, is achieved in that the bottom-up powder conveying mechanism is designed according to this embodiment of the invention. The bottom-up powder conveying mechanism in accordance with this embodiment of the invention no longer requires the process chamber of the PBLM system to be opened in order to fill the reservoir via its upper opening located in the process chamber, which results in reduced set-up times and non-productive times and in a corresponding increase in productivity.

Moreover, provision may be made in an advantageous manner that the PBLM system has a collecting reservoir for excess powder, which has an upper opening and may have in one side wall, an opening which is lower than the upper opening and can be opened and can be closed in a gas-tight manner via a closure, wherein in particular the collecting reservoir, whose upper and lower openings are designed to be retrofitted into a bottom-up powder conveying mechanism according to one of the embodiments in accordance with the invention, whose side wall is formed by the side wall of the collecting reservoir. This design ensures that the PBLM system can be retrofitted and operated easily amongst the embodiments described below, whereby the PBLM system can advantageously be used in a flexible manner to suit changing requirements.

In accordance with an aspect of the invention, an improved and modularly extendible or retrofittable PBLM system includes a bottom-up powder conveying mechanism, wherein the PBLM system includes a first reservoir which is operated as a component reservoir and has a floor movable in the manner of a piston and includes, as part of the bottom-up powder conveying mechanism, a reservoir which is operated as a powder reservoir and has a floor movable in the manner of a piston, and includes a collecting reservoir for excess powder, wherein the collecting reservoir has an upper opening, is achieved in that the collecting reservoir has, in a side wall, an opening which is lower than the upper opening and which can be opened and can be closed in a gas-tight manner preferably via a closure, wherein in particular the collecting reservoir, whose upper and lower openings are designed to be retrofitted into a bottom-up powder conveying mechanism according to one of the embodiments in accordance with the invention, whose side wall is formed by the side wall of the collecting reservoir. The design in accordance with this aspect of the invention ensures that the PBLM system can be retrofitted and operated easily amongst the embodiments described below, whereby the PBLM system can advantageously be used in a flexible manner to suit changing requirements.

The productivity of the PBLM system can be increased by virtue of the fact that the PBLM system has a second reservoir which is operated as a component reservoir and has a floor movable in the manner of a piston and the PBLM system is designed as a multiscanner unit.

In accordance with an aspect of the invention, an improved method for retrofitting and operating a PBLM system including a bottom-up powder conveying mechanism, wherein the PBLM system is operated in a first embodiment as a single scanner unit or as a multiscanner unit and has a first reservoir which is operated as a component reservoir and has a floor movable in the manner of a piston and has, as part of the bottom-up powder conveying mechanism, a second reservoir which is operated as a powder reservoir and has a floor movable in the manner of a piston, and includes a collecting reservoir for excess powder, wherein the collecting reservoir has an upper opening, is achieved in that with the collecting reservoir a third reservoir having a floor movable in the manner of a piston is formed as part of a similar new bottom-up powder conveying mechanism, in that a support plate as a movable floor is inserted via the upper opening into the collecting reservoir, and that a drive, preferably in the form of an electromechanical lifting cylinder, ball screw, belt drive, pneumatic or hydraulic drive, is arranged between an immovable floor of the collecting reservoir and the support plate in order to be able to raise or lower the support plate in the manner of a piston. The method in accordance with this aspect of the invention ensures that the PBLM system can be retrofitted and operated easily amongst the embodiments described below, whereby the PBLM system can advantageously be used in a flexible manner to suit changing requirements. As a result, retrofitting can be effected easily amongst the embodiments described below.

Moreover, provision may be made that the second reservoir in a second embodiment of the PBLM system is operated in addition to the first reservoir as an additional component reservoir and for this purpose the PBLM system is operated as a multiscanner unit. The productivity of the PBLM system can be further increased thereby because components with different layer thicknesses can be produced in parallel.

Moreover, provision may be made that one working plane of the PBLM system which is formed in particular at least partially by a chamber floor of a process chamber of the PBLM system is provided with an aperture which is formed by a wall adjoining the working plane, and that optionally the first reservoir and the second reservoir are arranged in the aperture, wherein the side wall thereof is preferably formed in each case by a portion of the wall and by a separating insert which is arranged in the aperture, spaces the two reservoirs apart from one another and is preferably releasably attached in the aperture, and wherein the PBLM system is operated as a multiscanner unit or that alternatively in a third embodiment, the third reservoir which is operated as a powder reservoir in the first or second embodiment becomes a second reservoir of the PBLM system, in that the separating insert is taken out of the aperture and in the aperture there is arranged only one first reservoir which is larger in comparison with the first and second embodiment and is operated as a component reservoir, wherein the side wall thereof is formed preferably by the wall defining the aperture. This enables particularly flexible use of the PBLM system so that in particular simple retrofitting is possible amongst the second and third embodiment. In the case of a single, correspondingly larger construction platform in the aperture, a plurality of components or a relatively large component can also be produced in parallel by a multiscanner system. Therefore, depending upon the number and size of the construction platform or the lasers provided it is possible to achieve a considerable increase in productivity.

BRIEF DESCRIPTION OF THE DRAWINGS

An exemplified embodiment of the invention will be explained in greater detail hereinafter with reference to the drawings, in which:

FIG. 1 shows a schematic view of a PBLM system in a first embodiment with the process chamber completely open;

FIG. 1a shows a side view of the PBLM system shown in FIG. 1 with the process chamber completely closed;

FIG. 1b shows a view of an inner side of the cover of the process chamber of the PBLM system shown in FIG. 1;

FIG. 1c shows a view of a powder application unit in its working position with the process chamber completely closed;

FIG. 2 shows a schematic view of a PBLM system in a second embodiment;

FIG. 3 shows a schematic view of a PBLM system in a third embodiment.

DETAILED DESCRIPTION OF THE PREFERRED EMBODIMENT

Figure 2A:
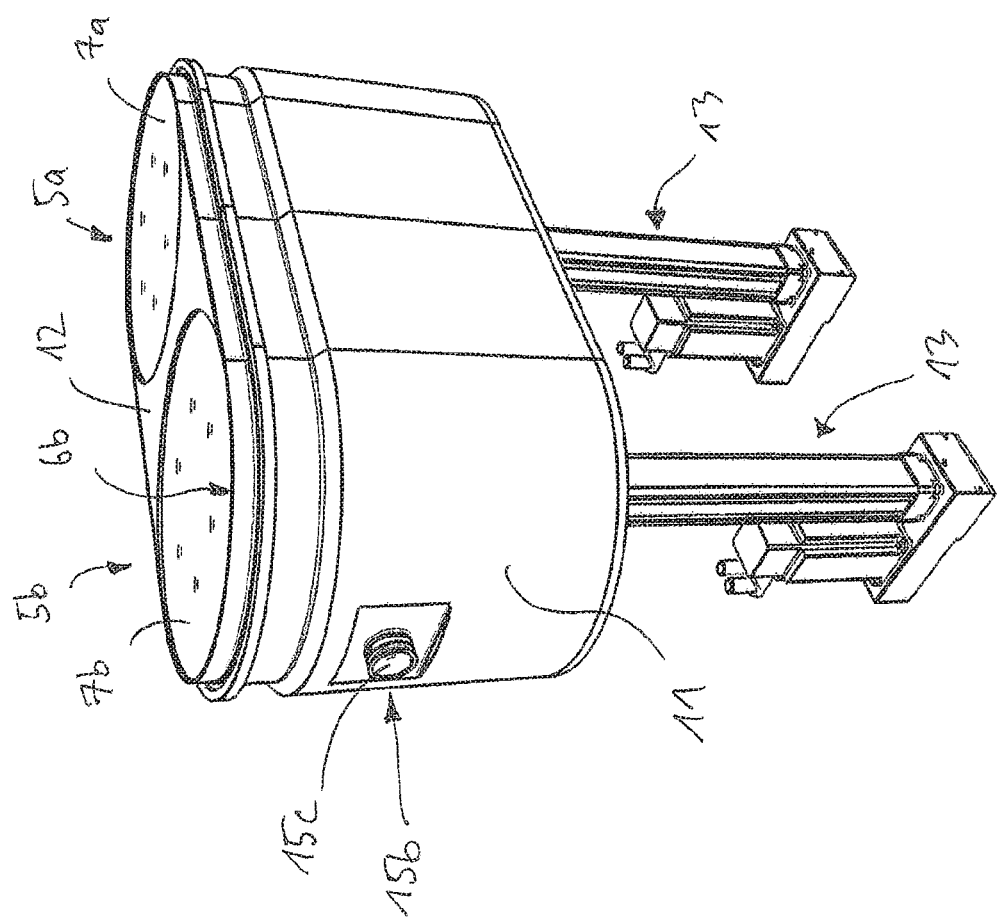
FIG. 2a shows a view of two reservoirs.

FIG. 1 shows a schematic view of a PBLM system 1 including a bottom-up powder conveying mechanism in a first embodiment which corresponds to a modularly extendible or retrofittable basic design. In the first embodiment, the PBLM system 1 is designed as a so-called single scanner system and having accordingly only one scanner unit 2 with a laser. However, basically the PBLM system 1 is not restricted to lasers because, instead of using a laser it is also possible to use another device which can generate electromagnetic radiation suitable for selectively melting the respective material, e.g. electron beam melting (EBM). Moreover, the PBLM system 1 has a frame-like table 3 which supports a process chamber 4 formed in the manner of a housing. The process chamber 4 has a substantially box-shaped or cuboidal structure with a chamber ceiling 4i formed as a movable cover 4a, a chamber floor 4b and four side walls 4c. Accordingly, the four side walls 4c are each formed in a rectangular shape and are formed by a rear wall 4e, a front wall 4f opposite thereto (see FIG. 1b) and two end walls 4g. On its underside, the process chamber 4 is connected to the table 3 via the chamber floor 4b. The cover 4a comprises at least the chamber ceiling 4i and, for the purpose of opening or closing the process chamber 4, can be moved relative to the chamber floor 4b and the table 3 between an open position illustrated in FIGS. 1, 2 and 3 and a closed position illustrated in FIGS. 1a and 1c. In the closed position, the cover 4a thus serves to close the process chamber 4 in its upper region or, in the open position, said cover ensures that the process chamber 4 is accessible from above. In this sense, the cover 4a cannot be equated to a possible side door on one of the side walls 4c.

In order to be able to perform the PBLM method, the cover 4a must be in the closed position. Only then is the process chamber 4 closed in a gas-tight manner with respect to its surrounding area so that, as described in the introduction, the protective gas atmosphere which is required to perform the PBLM method can be produced and maintained in the process chamber 4 by means of a protective gas feed, not illustrated.

The PBLM system 1 can be placed on a floor via the table 3. The scanner unit 2 arranged completely, in particular including the optical components for the defined coupling-in of the laser radiation, outside the process chamber 4, can be connected to the table 3 and can be securely supported thereon and/or can be stood separately on the floor as indicated in FIG. 1. Moreover, the scanner unit 2 can be pivoted above the process chamber 4 and/or next to the process chamber 4 and conversely can be pivoted back over the process chamber 4 for the ongoing operation of the PBLM system 1. The laser beam of the scanner unit 2 which is correspondingly pivoted back and is thus arranged above the process chamber 4 is then coupled into the process chamber 4 via one of two coupling-in glasses 4*d* provided in the cover 4*a* or the chamber ceiling 4*i* and is guided to the selected regions in the region of the powder layer to be melted. However, the PBLM system 1 can be designed not only as a single scanner system having a scanner unit 2 but can also be designed as a multiscanner system, in particular as a two-scanner system with two scanner units 2. Accordingly, at least one further laser beam must be coupled into the process chamber via one of the coupling-in glasses 4*d*, wherein a plurality of laser beams can also be coupled-in through a coupling-in glass 4*d*.

Arranged within the process chamber 4 is a horizontally extending working plane which is formed substantially by the chamber floor 4*b* or the surface thereof and is defined in a rectangular shape by the side walls 4*c*.

Moreover, a powder application unit 8 having an application medium in the form of a brush 8*e* which is movable in parallel with the working plane via a bar-shaped slide 8*a* is arranged in the process chamber 4, i.e. in a space enclosed by the closed process chamber 4. The powder application unit 8 is attached to an inner side of the cover 4*a* (see also FIG. 1*b*) and consequently, when the process chamber 4 is being opened, can be moved together with the cover 4*a* between the open position (see FIGS. 1, 2 and 3) and the closed position (see FIG. 1*a*). In this case, the powder application unit 8 is arranged in the closed position of the cover 4*a* and in particular during ongoing operation of the PBLM system 1 such that the slide 8*a* can be moved in a reciprocating manner above the working plane and in parallel therewith in a direction of travel F (see FIG. 1*c*) in order to effect a uniform application of powder on the construction platform and the substrate plate of the PBLM system 1 supported thereby by means of the application medium attached to the slide 8*a*. The closed position of the cover 4*a* corresponds to a working position of the powder application unit 8, wherein the powder application unit 8 is suspended from the cover 4*a* in the direction of the chamber floor 4*b*. By reason of the attachment of the powder application unit 8 to the cover 4*a*, no attachment to the chamber floor 4*b* is provided which means that the chamber floor is free of components of the powder application unit 8. The material, provided in powder form, for producing a component is provided to the application medium for this purpose by a bottom-up powder conveying mechanism, described in greater detail below, in the region of the working plane. Further details relating to the process chamber 4 and the powder application unit 8 are described in greater detail below.

Between its two ends, the working plane is not formed exclusively by the chamber floor 4*b* because three apertures which, as seen in the direction of travel F, are arranged next to one another and spaced apart from one another are provided in the chamber floor 4*b* and thus also in the working plane.

The two outer apertures are adjoined below the working plane in each case by a releasably attached collecting reservoir 14 serving as a powder overflow for excess powder. The corresponding aperture is defined in each case by an upper opening in the collecting reservoir 14 or a side wall 14*a* of the collecting reservoir 14, which for its formation extends at least with its inner side downwards at a right angle from the working plane, or by a correspondingly formed intermediate piece which connects the aperture to the collecting reservoir 14 or its upper opening. Each one of the collecting reservoirs 14 is arranged on one of the opposite ends of the working plane, between which the slide 8*a* with the application medium moves when the cover 4*a* is in the closed position. The base surfaces of the collecting reservoirs 14 are substantially trapezoidal. In this case, the correspondingly elongate and narrow base surfaces extend with their longitudinal extension in each case transversely to the direction of travel F and thus in parallel with the longitudinal extension of the application medium and of the slide 8*a*.

The inner one of the three apertures is adjoined below the working plane by a circumferential wall 11, whose inner side extends at a right angle to and away from the working plane. The first aperture is defined by the wall 11. In the region of the inner first aperture, a first reservoir 5*a* and a second reservoir 5*b* are arranged in the manner described in the introduction and in this case are enclosed at least partially by the wall 11. As a result, the two reservoirs 5*a*, 5*b* together with their upper openings adjoin the working plane via the inner aperture, whereby they are both allocated to the inner aperture. Both reservoirs 5*a* and 5*b* are constructed in a similar manner and in this case comprise a first and or second side wall 6*a* and 6*b* respectively. A first support plate 7*a* and a second support plate 7*b* located opposite the corresponding upper opening are each fitted within each side wall 6*a*, 6*b* and are arranged to be movable therein in the manner of a piston in order to form the corresponding floor of the reservoir 5*a*, 5*b*. The reservoirs 5*a*, 5*b* each have a base surface. The respective side wall 6*a*, 6*b* and the floor which is formed by the support plate 7*a*, 7*b* are formed corresponding to the base surface. In the present case, the side walls 6*a*, 6*b* are cylindrical so that the reservoirs 5*a*, 5*b* form a type of cylinder-piston unit.

Moreover, the wall 11 is part of the two reservoirs 5*a*, 5*b*, in that they each form a first portion of their side walls 6*a*, 6*b*. A separating insert 12 is inserted and releasably attached inside the wall 11 such that the first portion of the respective side wall 6*a* or 6*b* is completed by a second portion formed by the separating insert 12. As a result, the side wall 6*a*, 6*b* of each reservoir 5*a*, 5*b* is composed partially of the corresponding portion of the wall 11 and of the side of the separating insert 12 facing towards this portion and the two side walls 6*a*, 6*b* are connected to one another by means of the separating insert 12. Moreover, the separating insert 12 extends between the reservoirs 5*a*, 5*b* within the inner aperture at the height of the working plane, whereby it forms a part of the working plane and at the same time spaces apart and separates the two reservoirs 5*a*, 5*b* from one another.

By reason of a corresponding formation of the inner aperture or the wall 11 defining this aperture and of the separating insert 12, the reservoirs 5*a*, 5*b* can have a round base surface, a circular base surface as illustrated in particular in FIG. 1, or even an oval base surface. However, as an alternative it is also feasible to provide reservoirs 5*a*, 5*b* having square or rectangular base surfaces or having bases surfaces which have both round and straight side edges. The side walls 6*a*, 6*b* and the support plates 7*a*, 7*b* are formed corresponding to the base surface and the support plates 7*a*, 7*b* are also fitted into the respective side walls 6*a*, 6*b* in order to perform their above-described function as a piston or movable floor. In this case, the support plates 7*a*, 7*b* extend with their surface in each case corresponding to the base surface in parallel with the working plane and at a right angle to the side walls 6*a*, 6*b*. It is also feasible for two separate reservoirs 5*a*, 5*b* to be provided, without a separating insert 12 being required to form their side walls 6*a*, 6*b* or their inner sides which extend at a right angle to the working plane. Moreover, the reservoirs 5a, 5b do not have to be arranged in a common aperture. Furthermore, the base surfaces of the reservoirs 5a, 5b do not have to be identical as in the present exemplified embodiments and instead base surfaces which are not alike and are not the same size are also feasible. However, typically the base surface of each collecting reservoir 14 is smaller than the base surface of the first reservoir 5a operated as the component reservoir.

The support plates 7a, 7b can be lifted and lowered by means of schematically illustrated drives 13, which are designed e.g. as electromechanical lifting cylinders, ball screws, belt drives, pneumatic or hydraulic drives, within the respective reservoir 5a, 5b or the side walls 6a, 5b thereof in a purely translational or linear movement in a direction perpendicular in relation to the working plane, with the required precision to generate the desired layer thickness.

The first support plate 7a serves as a construction platform and is lowered during performance of the PBLM method, as described in the introduction, together with the substrate plate, not illustrated, starting from a starting position, wherein the component to be manufactured and the powder bed are built up on the first support plate 7a or the substrate plate attached thereto and are supported thereby within the reservoir 5a. In order to be able to screw the substrate plate to the support plate 7a, the support plate 7a has corresponding bores. The second reservoir 5b is part of the bottom-up powder conveying mechanism and in this case is also used as a storage reservoir for powder, wherein the second support plate 7b is raised during performance of the PBLM method, as described in the introduction, in the direction of the working plane in order to convey powder to the working plane, said powder being stored below the working plane in the second reservoir 5b. By inversely lowering the second support plate 7b, the volume of the second reservoir 5b is increased in order to be able to receive and store a corresponding quantity of new powder. In this case, the quantity of powder which can be received is limited by the volume of the second reservoir 5b when the support plate 7b is lowered to the maximum extent according to the maximum lifting height. FIG. 1 illustrates the two support plates 7a, 7b in each case in a raised position in the region of the working plane.

In order to load or fill the PBLM system 1 with material in powder form, such a bottom-up powder conveying mechanism or its reservoir can be filled through its upper opening and the associated aperture in the working plane. For this purpose, the process chamber 4 is to be opened so that when powder is being loaded in this manner a protective gas atmosphere cannot be maintained in the process chamber 4 and in particular oxygen enters the process chamber 4.

In particular, owing to the relative bulk density which is low in relation to the relative component density, the compaction of each powder layer ensures that the height of the finished component corresponds approximately to half the cumulative height of all of the powder layers to be applied for this purpose. Therefore, when the volume of the reservoirs 5a, 5b is identical, i.e. when the support plates 7a, 7b forming the respective floor have the same base surface and same maximum lifting height, it is not possible, with a reservoir 5b filled to the maximum extent, to produce a component having a component height corresponding to the maximum lifting height, which means that it is necessary to interrupt the PBLM method and to open the process chamber 4 in order to reload the second reservoir 5b with powder.

By virtue of the fact that the reservoirs 5a, 5b and the collecting reservoirs 14 are connected to the process chamber 4 via the respective aperture in the chamber floor 4b, when the PBLM method is being performed the protective gas atmosphere is also to be maintained at this location and the respective connection is correspondingly gas-tight. The reservoirs 5a, 5b and the collecting reservoirs 14 themselves are also gas-tight with respect to their surrounding area.

FIG. 1a shows a side view of the PBLM system 1 shown in FIG. 1 with the process chamber 4 completely closed. Proceeding from FIG. 1, in which the cover 4a is depicted in the open position and points with its inner side obliquely upwards and away from the PBLM system 1 and in particular away from the chamber floor 4b, the cover 4a has been moved together with the powder application unit 8, which is attached to the inner side, to the closed position. In order to be able to move the cover 4a to the position, which in FIG. 1 is closed, and back to the open position, the cover 4a is mounted so as to be correspondingly movable, in particular in an articulated manner and therefore so as to be pivotable. For this purpose, the PBLM system 1 comprises a pivot mechanism, between whose two pivot arms 16 (see also FIG. 1) the cover 4a and thus also the powder application unit 8 is rotatably mounted. The cover 4a can be pivoted manually or automatically between the open position and the closed position by means of a preferably form-locking traction drive 18, e.g. in the form of a geared belt drive or chain drive, and/or a force device 19, e.g. in the form of a spring element, preferably in the form of a gas compression spring, a hydraulic or pneumatic drive, in particular a lifting cylinder, or a linearly acting electric drive which each act upon the cover 4a and upon a fixed point of the PBLM system 1.

FIG. 1b shows a view of an inner side of the cover 4a of the process chamber 4 of the PBLM system 1. The powder application unit 8 is attached to the chamber ceiling 4i on the illustrated inner side of the cover 4a. Moreover, the entire front wall 4f is attached to the chamber ceiling 4i in order to form the cover 4a and to be movable together between the open position and the closed position. As a result, the front wall 4f is connected to the chamber floor 4b and the remaining adjoining side walls 4c only in the closed position and is spaced apart therefrom in all other positions. Therefore, particularly in the open position the chamber floor 4b is accessible without edges and thus without barriers in the corresponding region at the height of the working plane. This permits particularly easy cleaning of the process chamber 4.

In addition, each end wall 4g is split in two, of which each part is likewise attached as a part of the cover 4a to the chamber ceiling 4i. The parts of the end walls 4g which are complementary thereto and are attached to the chamber floor 4b (see FIG. 1) flatten starting from the rear wall 4e. Both parts form, in the closed position, a complete rectangular end wall 4g (see FIG. 1a). Moreover, at least one viewing window 4h is arranged in one of the side walls 4c, e.g. as shown in FIG. 1b two viewing windows 4h in the front wall 4f, through which in the closed position the process chamber 4 can be viewed.

In order to be able to reliably extract smoke gas which is produced during the PBLM method, contains in particular soot particles of the melted powder and attenuates the laser radiation coupled into the process chamber 4, a smoke gas extraction system split in two is provided. The smoke gas extraction system is part of a filter system for filtering a volume stream which contains the smoke gas of the PBLM system 1 and is guided through the PBLM system 1. Within the process chamber 4, the volume stream is divided into a first volume stream guided along the coupling-in glasses 4d and into a second volume stream guided along the working plane. Both volume streams are, where possible, homogeneous and laminar and mutually parallel at least in the region of the coupling-in glasses 4d or the chamber floor 4b. For this purpose, as seen in the direction of travel F, a strip 17d (see FIG. 1) of the smoke gas extraction system is provided in each case at opposite ends of the process chamber 4 on the chamber floor 4b.

A first part of the smoke gas extraction system which is attached to the cover 4a for the first volume stream comprises for each coupling-in glass 4d a flat and funnel-shaped channel 17 which, starting from a first opening 17a arranged on the corresponding coupling-in glass 4d, extends along the cover 4a in the direction of the end wall 4g. In this case, the opening 17a extends approximately over the width of the coupling-in glass 4d. The channel 17 tapers in the direction of the end wall 4g, then extends in a tubular manner, in particular at a right angle, away from the cover 4a and terminates with a second opening 17b. All of the components of the smoke gas extraction system attached to the cover 4a are arranged outside the movement region of the powder application unit 8, wherein the funnel-shaped region of the channel 17 is arranged between the cover 4a and the components of the powder application unit 8 which are movable in the direction of travel F. The first volume stream extends between the two openings 17a outside the channel 17 and in parallel with the chamber ceiling 4i through the process chamber 4 in order to discharge smoke gas from the region of the coupling-in glasses 4d from the process chamber 4. The smoke gas extraction system in the region of the coupling-in glasses 4d is important in order to prevent said glasses from becoming contaminated by deposits produced by smoke gas and reducing the power of the coupled-in laser beam or to prevent said glasses from being destroyed as a result of increased absorption of the laser radiation at the contaminated site by reason of strong local heating associated therewith.

A second part of the smoke gas extraction system which is provided for the second volume stream is formed by two facing intersections, of which in each case one is formed in one of the two strips 17d. Between the two intersections, the second volume stream is guided in the region of the chamber floor 4b through the process chamber 4 in order also to discharge smoke gas from the region of the working plane from the process chamber 4.

In order to divide the volume stream guided into the process chamber 4 or to combine the two volume streams to form one common volume stream guided through the filter system, each strip 17d has a third opening 17c which, when the cover 4a is closed, coincides with the second opening 17b in the tubular part of the channel 17 (see FIG. 2). The volume stream is caused, by the particular strip 17d, to flow into the process chamber 4 and to be separated, said process chamber being arranged more remotely from the component reservoir. The two volume streams are then combined by the strip 17d arranged more closely to the component reservoir and are guided out of the process chamber 4 in order to be filtered. After filtering, the filtered volume stream is guided via the intersection of the other strip 17d back into the process chamber 4 and is divided up accordingly.

The powder application unit 8 comprises not only the slide 8a for the application medium but also a linear drive unit 8b with a motor. The drive unit 8b is attached preferably completely to the chamber ceiling 4i, optionally also partially to one or a plurality of side walls 4c attached thereto and extends in the form of a rail in the direction of travel F and in this case preferably in parallel with a plane formed by the chamber ceiling 4i and preferably also in parallel with the front wall 4f. When the cover 4a is in the closed position, both the slide 8a and also the application medium extend with their longitudinal extension in parallel with the working plane and substantially transversely, in particular at a right angle, to the direction of travel F. By means of a drive block 8g which is driven by the drive unit 8b, a crossbar 8d, on which the slide 8a with the application medium is mounted, can be moved translationally in a reciprocating manner in the direction of travel F between opposite ends of the cover 4a which are formed by the two end walls 4g or the parts thereof connected to the chamber ceiling 4i. In this case, the crossbar 8d is connected at one of its two ends to the drive block 8g and is connected at the opposite other end to two guide carriages 8c for the purpose of absorbing transverse forces. The two guide carriages 8c are arranged at a fixed spaced interval one behind the other in the direction of travel F and can be moved along a guide rail 8f which serves as a guide and extends in a straight line in the manner of a linear guide. The guide rail 8f is attached to the chamber ceiling 4i in a similar manner to the drive unit 8b and extends spaced apart from the drive unit 8b and in parallel therewith and preferably in parallel with the plane formed by the chamber ceiling 4i. As a result, the direction of travel F in each position of the cover 4a or the powder application unit 8 is in parallel with the plane formed by the chamber ceiling 4i and in parallel with the working plane. At least when the cover 4a is in the closed position, the plane formed by the chamber ceiling 4i also lies in parallel with the horizontal working plane.

By virtue of this structure or the attachment of the powder application unit 8 above the working plane and in particular to the chamber ceiling 4i or the cover 4a, the powder application unit 8 is suspended in the working position, i.e. in the closed position of the cover 4a, from the chamber ceiling 4i or from the cover 4a to the working plane.

Arranged between the linear drive unit 8b and the guide rail 8f are the two coupling-in glasses 4d, as a result of which, when the cover 4a is closed, in each case at least one laser beam can be coupled-in and guided to the corresponding reservoir 5a or 5b. It is also possible to view the process chamber 4 and the working plane through the coupling-in glasses 4d. However, it is likewise feasible for only one coupling-in glass 4d, which is dimensioned correspondingly larger, to be provided in order with the laser beams to reach at least the support plates 7a, 7b or substrate plates of the two reservoirs 5a, 5b if the PBLM system 1 is a multiscanner system.

FIG. 1c illustrates a view of the powder application unit 8 in its previously described working position when the process chamber 4 is completely closed. It is possible to see the drive block 8g, via which the crossbar 8d is drivingly connected to the drive unit 8b. The crossbar 8d and the slide 8a supported thereby are suspended in the direction of the chamber floor 4b and are arranged accordingly between the guide rail 8f or the drive unit 8b and the chamber floor 4b. Therefore, no component of the powder application unit 8 is attached to the chamber floor 4b or the working plane, but instead is located as far as possible therefrom, so as to minimise contamination by powder in the region of the movable components or guide components, in particular the connection of the guide carriages 8c to the guide rail 8f and of the drive block 8g to the drive unit 8b, which connection is concealed in FIG. 1 and is therefore not illustrated.

When the cover 4a is in the closed position to allow ongoing operation of the PBLM system 1, the powder application unit 8 is in the working position (see FIG. 1c), wherein at least the application medium extends in parallel with the substrate plate and the working plane, so that on the construction platform of the PBLM system 1 in the direction of travel F powder can be applied uniformly with a surface of the respective powder layer which is as flat as possible and is as parallel as possible with the substrate plate and the working plane. In order to be able to orient the application medium in parallel with the surface of the substrate plate or the working plane or even to be able to easily change same, the slide 8a has a clamping holder, to which or by means of which the corresponding application medium can be releasably attached and correspondingly oriented. For this purpose, each coupling-in glass 4d is releasably attached and removable so that after its removal from the chamber ceiling 4i the powder application unit in the process chamber 4 is accessible for corresponding orientation even when the cover 4a is in the closed position. Preferably, the drive unit 8b and the guide rail 8f also extend in parallel with the working plane. Alternatively the slide 8a with the application medium can also be mounted so as to be able to rotate about an axis arranged at a right angle to the working plane or between the two reservoirs 5a, 5b, wherein the drive unit 8b represents a corresponding rotary drive.

The brush 8e which serves as an application medium and is movable via the slide 8a or guide carriage 8c extends continuously along the longitudinal extension of the slide 8a and in the working position between the slide 8a and the working plane or the chamber floor 4b. Preferably, the brush 8e extends in the working position and during performance of the PBLM method to the working plane or to the chamber floor 4b and contacts same in order to entrain as completely as possible powder which, as seen in the respective direction of travel F, is located upstream of the slide 8a or the brush 8e, and at the same time to produce the flattest surface possible of the powder layer at the height of the working plane. An effective length is defined by the associated extension of the brush 8e along the longitudinal extension of the slide 8a. The application medium can entrain powder and apply it uniformly only in the region of the effective length. The effective length can also be formed by more than one brush 8e if these brushes are positioned correspondingly closely next to one another.

When the cover 4a is in the closed position, the effective length of the application medium is congruent with or shorter than the corresponding longitudinal extension of the base surface of collecting reservoirs 14, so that the excess powder can be pushed as completely as possible into the powder overflow, without collecting on the working plane on the edges of the respective powder overflow. However, in order to be able to produce a uniform powder layer, the slide 8a, with its effective length formed by the application medium, completely spans at least in the working position the first reservoir 5a for the component, preferably also the reservoir of the corresponding bottom-up powder conveying mechanism. As a result, the application medium serves not only to push powder onto the first support plate 7a or the substrate plate but also serves as means for smoothing the powder layer produced at the desired layer thickness thereby. In the case of the first powder layer, the desired layer thickness of the powder layer corresponds to the spaced interval between the working plane and the substrate plate and in the case of each further powder layer corresponds to the spaced interval between the working plane and the surface of the preceding powder layer.

Moreover, the application medium extends alone or together with the slide 8a starting from the working plane over an effective height which permits entrainment of a powder quantity which is sufficient for the application of at least one uniform powder layer.

Instead of using a brush 8e, it is also possible to use another application medium, such as e.g. a rubber lip, silicone lip, blade or roller.

FIG. 2 shows a schematic view of the PBLM system 1 in a second embodiment which, starting from a basic design, has been modularly extended or retrofitted. In this case, the PBLM system 1 differs from the basic design in that it is designed as a multiscanner system, e.g. in the form of a two-scanner system and accordingly has been extended by a second scanner unit 2. Moreover, the second reservoir 5b is no longer operated as a powder reservoir of the bottom-up powder conveying mechanism but instead is operated as an additional component reservoir. The second support plate 7b forming the movable floor correspondingly represents an additional construction platform, on which a substrate plate can be screwed via corresponding bores and which is lowered during performance of the PBLM method in the same way as the first support plate 7a of the first component reservoir. Therefore, each construction platform can be allocated at least one scanner unit or also a plurality of scanner units 2 when operated as a multiscanner system, whereby two different components can be built up independently of one another and simultaneously within the process chamber 4. By reason of the two mutually independent construction platforms, the respective components can be produced in particular also with different layer thicknesses and thus also at different rates.

This type of retrofitting or operation of the second reservoir 5b as a second component reservoir requires the setting up of a new bottom-up powder conveying mechanism. For this purpose, by incorporating one of the two collecting reservoirs 14 a third reservoir 5c having a floor movable in the manner of a piston is provided in order form a new bottom-up powder conveying mechanism or powder reservoir. In order to facilitate this, each of the two powder overflows is designed in the same manner and in particular such that it can optionally be retrofitted to become a bottom-up powder conveying mechanism.

For this purpose, the PBLM system 1 in the basic design is to be designed as described hereinafter, so that it can be modularly extended or retrofitted for operation in the second embodiment.

In order to retrofit the selected collecting reservoir 14 to form a corresponding powder reservoir, a third support plate 7c is inserted as a floor, which is movable in the manner of a piston, into the collecting reservoir 14 or between its side walls 14a which correspondingly form side walls 6c of the reservoir 5c. In a similar manner to the drive 13 of the first and second support plate 7a, 7b, a corresponding drive, e.g. in the form of an electromechanical lifting cylinder, ball screw, belt drive, pneumatic or hydraulic drive, is disposed within the collecting reservoir 14, in particular between the support plate 7c and an immovable floor of the collecting reservoir 14 in order thereby to be able to raise or lower the support plate 7c in the manner of a piston. The support plate 7c is accordingly fitted to the base surface of the collecting reservoir 14 within its side walls 14a.

Since the base surface of the collecting reservoir 14 and thus, at the same maximum lifting height, also the volume, available at a maximum for receiving powder, of the third reservoir 5c formed therewith is less than that of the two reservoirs 5a, 5b, a comparatively smaller amount of powder can also be stored in the reservoir 5c. Since the PBLM system 1, in the second embodiment with the first two reservoirs 5a, 5b, has two construction platforms which each have to be provided with corresponding powder layers, this still requires powder to be loaded in the reservoir 5c more frequently than described above in relation to reservoirs 5a, 5b of equal size.

In order to overcome this problem, the bottom-up powder conveying mechanism in accordance with the invention is designed such that it can be supplied or loaded with new powder via the cover 4a and thus also during ongoing operation of the PBLM system 1 without opening the process chamber 4.

For this purpose, the collecting reservoir 14 incorporated as the third reservoir 5c into the bottom-up powder conveying mechanism is preferably already configured in the basic design such that it has a lower opening 15a (see FIG. 2) in its side wall 6c or 14a and thus below the working plane and below the upper opening at that location in the collecting reservoir 14, the reservoir 5c being able to be filled with powder through said lower opening. The opening 15a can also be provided subsequently. In the basic design, the opening 15a can be opened and is closed in a gas-tight manner e.g. by means of a suitable closure 15c (see FIG. 2a). The bottom-up powder conveying mechanism can be modularly extended via the opening 15a because, as illustrated in FIG. 2, a conduit can be connected in a gas-tight and releasable manner to the reservoir 5c or its side wall 6c in order for the reservoir 5c to be filled with powder thereby. The conduit is likewise gas-tight and is designed preferably as a tube 10 or flexible hose. The bottom-up powder conveying mechanism is connected via the conduit in a gas-tight manner to an external reservoir 9 which serves as a storage reservoir for powder and is filled with powder accordingly. Therefore, the external reservoir 9 arranged outside the reservoir 5c of the bottom-up powder conveying mechanism is gas-tight or can be closed in a gas-tight manner. Therefore, powder can be conducted from the external reservoir 9 into the reservoir 5c through the conduit leading thereto in order to fill or load said reservoir during ongoing operation of the PBLM system 1 and thus when the process chamber 4 is closed. In this case, the conduit is designed preferably in the manner of a chute and accordingly is formed between the external reservoir 9, arranged above the opening 15a, and the opening 15a with a slope in order to conduct the powder in a gravity-driven manner to the reservoir 5c and through the opening 15a. The opening 15a is to be positioned at least in such a manner that the powder fed via the conduit can fall through the opening 15a in at least one position of the support plate 7c into the reservoir 5c and can fill said reservoir from the support plate 7c to the height of the opening 15a. In order thus to be able to introduce the largest quantity of powder possible, the opening 15a is arranged preferably in the upper region of the side wall 6c of the reservoir 5c and thus at the greatest possible spaced interval with respect to the most remote position of the support plate 7c which said support plate can assume in relation to the working plane.

Moreover, the bottom-up powder conveying mechanism which has been extended accordingly has a closure mechanism which is arranged preferably in the conduit and in particular in the region of its end facing towards the opening 15a and is designed e.g. as a gas-tight vacuum closure, in particular as a disk valve. Alternatively, the closure mechanism can also be arranged on the side wall 6c or in the opening 15a. The loading of powder in the reservoir 5c can be regulated by means of a corresponding activation or manual actuation of the closure mechanism, in that the closure mechanism and thus also the conduit or the opening 15a are closed or opened during ongoing operation of the PBLM system 1 such that powder can enter the reservoir 5c or pass between its side walls 6c only when the third support plate 7c is in a suitable position below the opening 15a. When a vacuum closure is used, the protective gas atmosphere can be maintained in relation to the vacuum closure on the system side with a correspondingly smaller volume, so that on a side of the vacuum closure remote therefrom the conduit and/or the reservoir 9 can be removed or opened for replenishment, without the protective gas atmosphere on the system side being affected thereby. In order to prevent powder from passing underneath the support plate 7c, the support plate 7c is to be lowered for the purpose of loading powder to such an extent that the opening 15a is arranged between the working plane and the support plate 7c before the closure mechanism is opened.

Furthermore, the collecting reservoir 14 which is not retrofitted to form a bottom-up powder conveying mechanism and is not incorporated therein serves as a powder overflow.

FIG. 2a shows a view of the first two reservoirs 5a, 5b with raised support plates 7a, 7b. As previously described in relation to the second embodiment and the collecting reservoir 14, an opening 15b which is lower than the upper opening of the reservoir 5b is also provided in the wall 11 or side wall 6b of the reservoir 5b of the corresponding bottom-up powder conveying mechanism. As a result, the bottom-up powder conveying mechanism of the PBLM system 1 shown in FIG. 1 in the first embodiment can be modularly extended such that its reservoir 5b which is operated as a powder reservoir can be filled or loaded with new powder via the cover 4a and thus also during ongoing operation of the PBLM system 1 without opening the process chamber 4. The opening 15b is closed by means of a closure 15c. Then, as described with reference to FIG. 2, a conduit and an external reservoir 9 arranged externally in relation to the reservoir 5b can optionally be connected in the same manner via the opening 15b in order to be able to fill the bottom-up powder conveying mechanism with powder accordingly through the opening 15b. For this purpose, it is necessary, where appropriate, to remove the corresponding, releasably attached collecting reservoir 14 illustrated in FIG. 1 in order to guide the conduit, as shown in FIG. 2, laterally in the region of the end wall 4g under the working plane away from the table 3 and in the direction of the reservoir 9. In the second embodiment, the opening 15b in the side wall 6b of the second reservoir 5b formed by the wall 11 is closed by means of the closure 15c (not shown in FIG. 2).

In particular, said components of the extended bottom-up powder conveying mechanism for loading powder therein during ongoing operation of the PBLM system 1 are designed and can be connected in a gas-tight manner to the respective bottom-up powder conveying mechanism such that the protective gas atmosphere can also be maintained in the external reservoir 9 and in the conduit.

It is also feasible, proceeding from a bottom-up powder conveying mechanism—extended in the manner stated above—of the PBLM system 1 in the first embodiment, to undertake retrofitting for operation in the second embodiment, in that the conduit is connected to the corresponding opening 15a in the collecting reservoir 14, the opening 15b in the reservoir 5b is closed by means of the closure 15c and by adding the support plate 7c and the drive, as described above, the bottom-up powder conveying mechanism is formed with the collecting reservoir 14 so that the reservoir 5b can be operated as a component reservoir. Correspondingly inverse retrofitting is likewise possible.

FIG. 3 shows a schematic view of the PBLM system 1 in a third embodiment which differs from the second embodiment in that it is designed as a single scanner system having only one scanner unit 2. However, a multiscanner system is optionally also feasible.

Moreover, the separating insert 12 is removed and only a first reservoir 5a is still arranged in the region of the inner aperture, said reservoir adjoining, with its upper opening, the working plane via the inner aperture. In the third embodiment, the side wall 6a of the first reservoir 5a is formed completely by the wall 11, whereby the aperture is also defined by the reservoir 5a. The opening 15b (see FIG. 2a) which, in this case, is provided in the wall 11 is closed by means of the closure 15c (not shown in FIG. 3). A first support plate 7a which is dimensioned correspondingly larger than in the first two embodiments is fitted as a movable floor into the reservoir 5a. As a result, the first reservoir 5a is larger in the third embodiment than in the first two embodiments. The first reservoir 5a comprises in this case at least one correspondingly centred drive or both of the drives 13 provided in the first two embodiments in order to be able to jointly lift and lower the support plate 7a. Therefore, the PBLM system 1 can be easily retrofitted for producing larger components by removing the separating insert 12, replacing the two support plates 7a, 7b of the first embodiment with the support plate 7a of the third embodiment and by the above-described retrofitting of a powder overflow into a new bottom-up powder conveying mechanism. By retrofitting the powder overflow, the third embodiment comprises only a second reservoir 5b which corresponds to the third reservoir 5c described in relation to the second exemplified embodiment, is operated as a powder reservoir and is likewise modularly extendible and extended for effecting filling during ongoing operation of the PBLM system 1.

Conversely, it is likewise feasible to retrofit the PBLM system 1 proceeding from the third embodiment to the second embodiment, in that the support plate 7a of the third embodiment is removed, the separating insert 12 and the two support plates 7a, 7b of the second embodiment are inserted and the second scanner unit 2 is installed.

The PBLM system 1 can also be retrofitted directly from the first embodiment to the third embodiment and vice versa.

Basically, each of the previously described PBLM systems 1 can have only the opening 15a in the side wall 14a of the collecting reservoir 14, only the opening 15b in the side wall 6b or in the wall 11 or both openings 15a and 15b with the modular extension capability of the associated powder reservoir resulting therefrom in each case.

A dedicated invention can be seen in particular in a method for the above-described retrofitting and for operating a PBLM system 1 proceeding from the PBLM system 1 in the first embodiment to the second and/or third embodiment and vice versa, and proceeding from the second embodiment to the third embodiment and vice versa, in particular in the respective steps for retrofitting the collecting reservoir 14 to form a powder reservoir of the bottom-up powder mechanism, in the arrangement or removal of the separating insert 12 in the inner aperture to form two reservoirs 5a, 5b or one larger reservoir 5a, and in the optional operation of the second reservoir 5b as a powder reservoir in the first embodiment or as a component reservoir in the second embodiment. The steps for extending a bottom-up powder conveying mechanism are identical, for the associated reservoir 5b in the first embodiment, to the corresponding steps for the associated reservoir 5c in the second embodiment or the associated reservoir 5b in the third embodiment which comprise a correspondingly retrofitted collecting reservoir 14.

The invention claimed is:

1. A bottom-up powder conveying mechanism for a powder bed-based laser melting (PBLM) system that includes a chamber floor defining a working plane of the PBLM system at which laser melting is performed, the mechanism comprising:
    a powder reservoir disposed below the chamber floor and having a stationary side wall, an upper opening and a movable floor, wherein the moveable floor is configured as a piston to convey powder in the direction of the upper opening in the powder reservoir opposite the moveable floor and through the upper opening in the powder reservoir and to the working plane of the PBLM system;
    wherein the bottom-up powder conveying mechanism comprises an external reservoir that is closed in a gas-tight manner and is connected in a gas-tight manner to a gas-tight sloping conduit to conduct the powder, via the sloping conduit, from the external reservoir into the powder reservoir;
    wherein the side wall of the powder reservoir includes a lower opening which is lower than the upper opening in the powder reservoir and through which the powder reservoir can be filled with the powder, and wherein the external reservoir is disposed vertically higher than the lower opening;
    wherein the lower opening can be connected in a gas-tight and releasable manner to the sloping conduit in order to be able to conduct the powder in a gravity-driven manner from the external reservoir that is arranged above the lower opening such that the powder can be conducted from the external reservoir through the sloping conduit and through the lower opening into the powder reservoir.

2. The bottom-up powder conveying mechanism as claimed in claim 1, wherein the lower opening can be closed in a gas-tight manner and can be opened in order to fill the powder reservoir with the powder through the lower opening.

3. The bottom-up powder conveying mechanism as claimed in claim 2, wherein the sloping conduit is a tube or a flexible hose.

4. The bottom-up powder conveying mechanism as claimed in claim 2, wherein the bottom-up powder conveying mechanism has an external reservoir closure that can be closed and opened automatically or manually in order to regulate/control the filling of the powder reservoir with the powder through the lower opening, and which is arranged in the conduit and/or the lower opening and can be closed and opened during ongoing operation of the PBLM system such that the powder is conducted through the opening only when the lower opening is arranged between the working plane and a support plate serving as the second floor of the powder reservoir.

5. The bottom-up powder conveying mechanism as claimed in claim 1, wherein the conduit is designed as a tube or a flexible hose.

6. The bottom-up conveying mechanism as claimed in claim 5, wherein the bottom-up powder conveying mechanism has an external reservoir closure that can be closed and opened automatically or manually in order to regulate/control the filling of the powder reservoir with the powder through the lower opening, and which is arranged in the conduit and/or the lower opening and can be closed and opened during ongoing operation of the PBLM system such that powder is conducted through the opening only when the opening is arranged between the working plane and a support plate serving as the second floor of the powder reservoir.

7. The bottom-up powder conveying mechanism as claimed in claim 1, further comprising an external reservoir closure that can be closed and opened automatically or manually in order to regulate/control the filling of the powder reservoir with the powder through the lower opening, wherein the external reservoir closure is arranged in the sloping conduit and/or the lower opening and can be closed and opened during ongoing operation of the PBLM system, and wherein the powder is conducted through the lower opening only when the lower opening is arranged between the working plane of the PBLM system and a support plate serving as the moveable floor of the powder reservoir.

8. The bottom-up powder conveying mechanism as claimed in claim 1 further comprising an additional reservoir which is operated as a component reservoir and has a movable component reservoir floor.

9. The bottom-up powder conveying mechanism as claimed in claim 1, wherein the powder reservoir comprises a collecting reservoir for excess powder that has been retrofitted to be the powder reservoir whereby the side wall of the powder reservoir is formed by a side wall of the collecting reservoir with a lower opening of the collecting reservoir being the lower opening of the powder reservoir and an upper opening of the collecting reservoir being the upper opening of the powder reservoir, and wherein the lower opening of the collecting reservoir can be opened and closed in a gas-tight manner via a closure.

* * * * *